United States Patent
Rouvellou

(10) Patent No.: US 6,920,252 B2
(45) Date of Patent: Jul. 19, 2005

(54) DATA PROCESSING METHOD

(75) Inventor: Laurent Jean Marie Rouvellou, Paris (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 764 days.

(21) Appl. No.: 10/024,768

(22) Filed: Dec. 19, 2001

(65) Prior Publication Data

US 2002/0122602 A1 Sep. 5, 2002

(30) Foreign Application Priority Data

Dec. 26, 2000  (FR) .......................................... 00 17046

(51) Int. Cl.[7] .............................................. G06K 9/40
(52) U.S. Cl. ....................... 382/275; 382/266; 382/261
(58) Field of Search ........................ 382/254, 260–266, 382/270, 275; 348/470, 533, 607, 610

(56) References Cited

U.S. PATENT DOCUMENTS

| | | | | |
|---|---|---|---|---|
| 5,422,964 A | | 6/1995 | Devimeux et al. .......... | 382/226 |
| 5,883,983 A | * | 3/1999 | Lee et al. .................... | 382/268 |
| 5,974,197 A | * | 10/1999 | Lee et al. .................... | 382/268 |
| 6,259,823 B1 | * | 7/2001 | Lee et al. .................... | 382/268 |
| 6,631,162 B1 | * | 10/2003 | Lee et al. .................... | 375/240.16 |
| 6,795,588 B1 | * | 9/2004 | Nio et al. .................... | 382/261 |
| 6,822,675 B2 | * | 11/2004 | Jung et al. .................. | 348/180 |

FOREIGN PATENT DOCUMENTS

| | | | |
|---|---|---|---|
| EP | 0817497 A2 | 1/1998 | |
| WO | WO0042778 | 7/2000 | .......... H04N/5/028 |

* cited by examiner

*Primary Examiner*—Amelia M. Au
*Assistant Examiner*—Wes Tucker

(57) ABSTRACT

The present invention relates to a data processing method, which data are included in an incoming digital image. This method comprises a calculation step (ACT) of a spatial activity value of a current pixel based on values (Y) of said current pixel and pixels adjacent thereto, a determination step (NND) of a non-natural uniform area (NN) if the spatial activity value of various consecutive pixels is lower than a first predetermined threshold value. The invention also includes a gradient filter step (GF) of values (Y) of the pixels adapted to detect (THR1) strong edges (SE) inside the image and a detection step (RD) of a ringing artifact. The invention finally comprises a filter step (FIL) of values (Y) of the pixels comprised in a filtering area which is located between a non-natural uniform area (NN) and a strong edge (SE) which are close together and where at least a ringing artifact has been detected.

8 Claims, 3 Drawing Sheets

DATA PROCESSING METHOD

Figure 1:
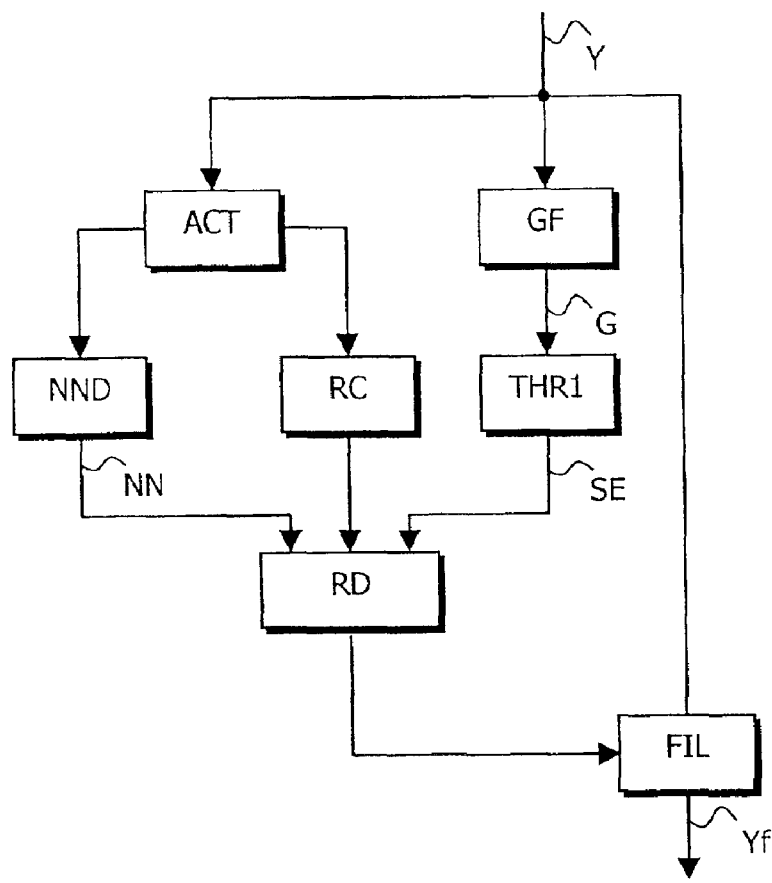

The present invention relates to a data processing method, which data are included in an incoming digital image.

The invention finds its application for detecting ringing noise in a previously coded digital image which is thereafter decoded according to a block-based coding technique, the MPEG standard (Motion Pictures Expert Group), for example, and for the correction of the data included in the digital image so as to attenuate visual artifacts caused by the block-based coding technique.

European patent no. 0 817 497 A2 describes a method which permits to reduce blocking artifacts and artifacts due to the ringing noise of a motion-compensated image. For this purpose, the filter method according to the prior art comprises a gradient filter step which permits to generate a binary edge map on which global thresholding and local thresholding are performed. Said method comprises a step which permits to decide whether an area inside the binary edge map, which area is determined with the aid of a filter window, is a homogeneous area or an area containing edges. The method finally comprises a filter step which utilizes a first set of predetermined coefficients if the area is homogenous, and a second set of predetermined coefficients if the area contains edges, the second set of predetermined coefficients being adapted as a function of the position of the contours in the area.

It is an object of the present invention to propose a data processing method which permits to detect ringing noise.

As a matter of fact, if the prior-art method permits to partly correct ringing noise, it does not disclose a method which permits to detect said noise. Without the detection and the localization of this ringing noise, it is difficult to apply a post-processing method that is really effective.

In order to compensate for these drawbacks, the data processing method according to the present invention is characterized in that it comprises the steps of:

calculating a spatial activity value of a current pixel based on values of said current pixel and of pixels adjacent thereto,
determining a non-natural uniform area if the spatial activity value of various consecutive pixels is lower than a first predetermined threshold value,
gradient filtering values of the pixels adapted to detect strong edges inside the image,
determining an artifact if the spatial activity value of a current pixel is higher than a second predetermined threshold value and is concentrated on said pixel, and
detecting a ringing artifact if the artifact coming from the artifact determination step lies between a non-natural uniform area and a strong edge which are close together.

With such a data processing method, a ringing noise is detected as being a pixel having much spatial activity which is likely to appear between a non-natural uniform area and a strong edge which are close together in space. The ringing noise detection method may thus lead to an improvement of their correction, the filtering following the detection step may be applied in an adaptive manner.

Therefore, the data processing method according to the present invention is characterized in that it further includes a step of filtering values of pixels lying in a filtering area which is between a non-natural uniform area and a strong edge which are close together or at least a ringing artifact has been detected.

Such a data processing method may thus use a first filter for a pixel adjacent to a strong edge, the coefficients of said first filter depending on the position of the adjacent pixel relative to the strong edge, and a second filter for the other pixels of the filtering area.

The coupling of the processing method of ringing artifacts to a method of processing blocking artifacts permits to improve the corrected image quality relative to the initial image.

Therefore, the data processing method according to the present invention is characterized in that it is associated with a blocking artifact processing method, the second method utilizing the same gradient filter step of values of the pixels for detecting a natural contour area inside the image.

The existence of a common step enhances the efficiency of the data processing method while simplifying the implementation of the association of the two methods.

These and other aspects of the invention are apparent from and will be elucidated, by way of non-limitative example, with reference to the embodiment(s) described hereinafter.

Figure 2:
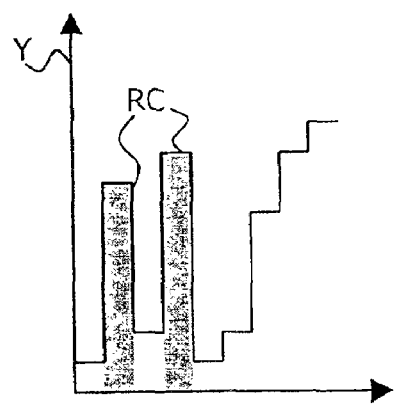
Figure 3:
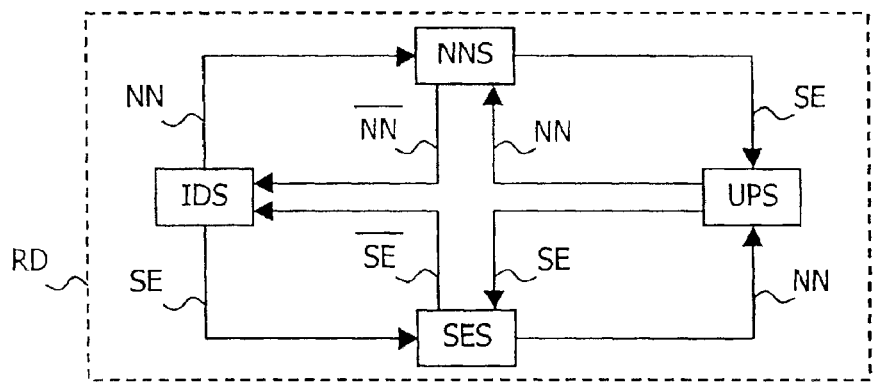
Figure 4:
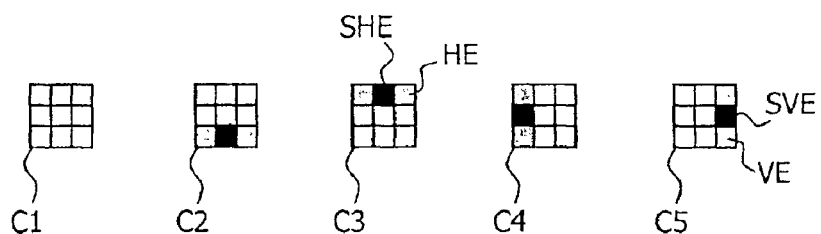
Figures 5A, 5B, 5C, 5D:
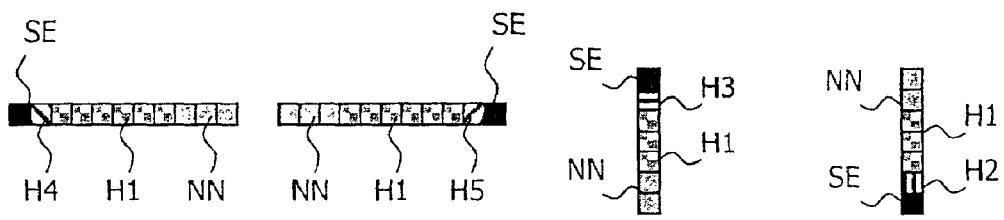
Figure 6:
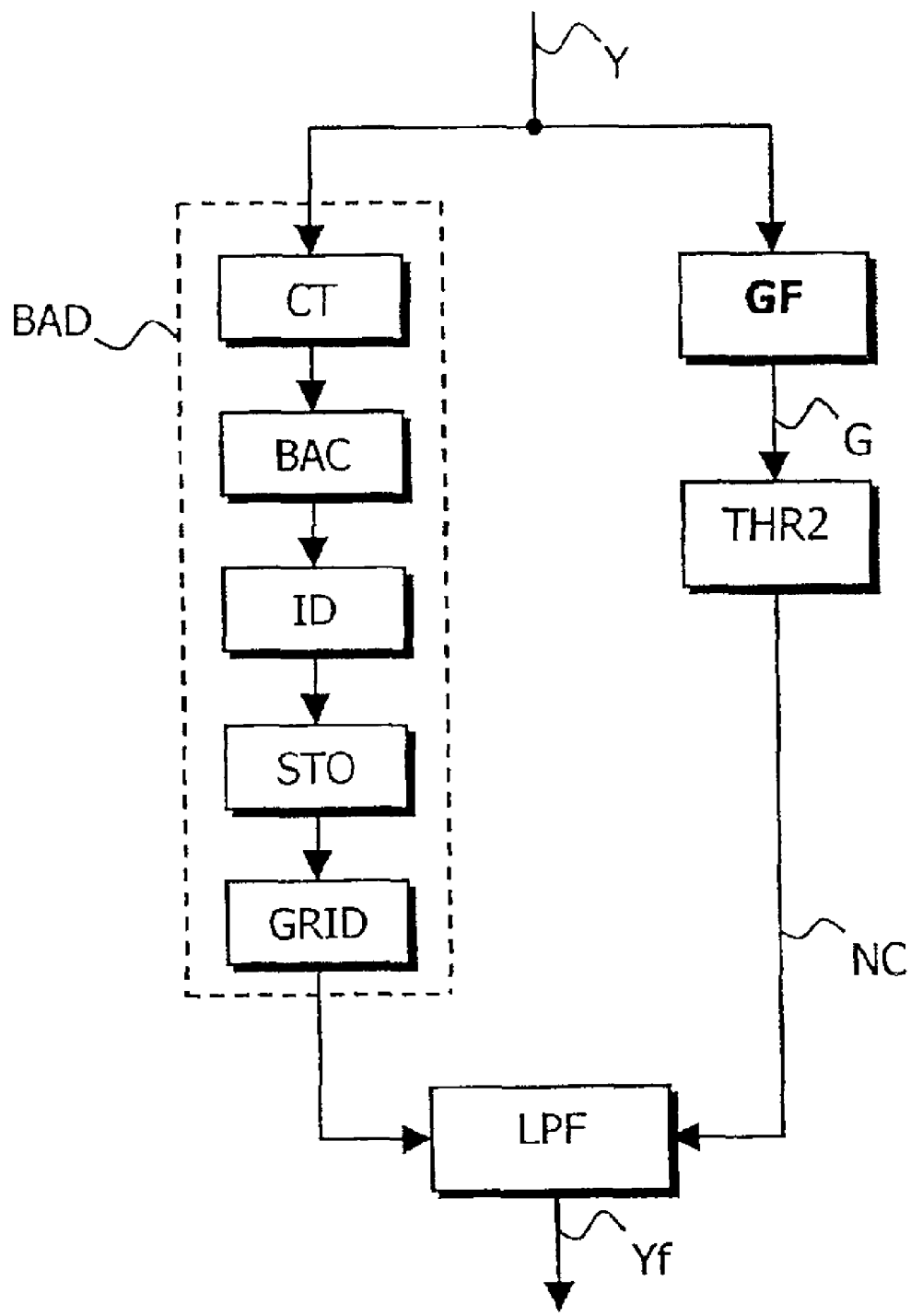

In the drawings:

FIG. 1 is a diagram representing the data processing method according to the present invention, FIG. 2 illustrates the step of determining artifacts originating from the ringing noise for a given configuration of pixel values, FIG. 3 is a diagram representing the step of detecting ringing artifacts, FIG. 4 illustrates the various pixel configurations taken into account by the post-processing step according to the invention, FIGS. 5a, b, c and d illustrate the post-processing step for different configurations of pixels comprising non-natural uniform areas and strong edges, and FIG. 6 is a diagram representing the blocking artifact processing method according to the present invention.

The present invention relates to a method of processing data which are contained in a digital video input signal, said method being intended to improve the visual quality of said digital video signal when the latter has previously been coded according to a block-based coding technique.

The data processing method has been developed more particularly in the framework of coded and decoded digital image sequences according to the MPEG standard. The method nevertheless remains applicable to any other digital video signal which has been coded and then decoded according to a block-based coding technique such as H.261 or H.263, for example.

FIG. 1 represents a diagram of the data processing method according to the invention. Said data processing method comprises:

a step (ACT) of calculating a spatial activity value of a current pixel based on values (Y) of said current pixel and of pixels adjacent thereto,
a step (NND) of determining a non-natural uniform area (NN) if the spatial activity value of various consecutive pixels is lower than a first predetermined threshold value,
a gradient filter step (GF) of values (Y) of the pixels adapted to detect (THR1) strong edges (SE) inside the image,
a step (RC) of determining an artifact if the spatial activity value of a current pixel is higher than a second predetermined threshold value and is concentrated on said pixel,
a step (RD) of detecting a ringing artifact if the artifact coming from the artifact determination step (RC) is situated between a non-natural uniform area (NN) and a strong edge (SE) which are close together,
a step (FIL) of filtering the values (Y) of the pixels contained in a filtering area, which are situated between a non-natural uniform area (NN) and a strong edge (SE) which are close together or at least one ringing artifact has been detected.

In a first instance, it is an object of the data processing method to detect the artifacts which are due to the ringing noise. These artifacts generally appear around considerably contrasting edges. Said ringing artifacts show, depending on the orientation of the edges, either a shimmering effect along the contour or a multiple echo effect.

The method of detecting ringing artifacts is based on the fact that the blocks which contain strong edges and are situated in an area of very low spatial activity may be ringing artifacts. Therefore, the data processing method comprises first of all a step (ACT) of calculating a spatial activity value of a current pixel based on values (Y) of said pixel current and of pixels adjacent thereto. In the preferred embodiment the spatial activity $\sigma(i,j)$ of a current position pixel $(i,j)$ is calculated according to the equations (1) to (3) based on the luminance values (Y) of the pixels:

$$\sigma(i,j)=\sigma_h(i,j)+\sigma_v(i,j) \qquad (1)$$

$$\sigma_h(i,j)=abs(Y(i,j)-Y(i,j+1))+abs(Y(i,j)-Y(i,j-1)) \qquad (2)$$

$$\sigma_v(i,j)=abs(Y(i,j)-Y(i+1,j))+abs(Y(i,j)-Y(i-1,j)) \qquad (3)$$

where $abs(x)$ is the function that gives the absolute value of x.

According to an embodiment which is more economic from the point of view of implementation, the vertical spatial activity is calculated in the following manner:

$$\sigma_v(i,j)=abs(Y(i,j)-Y(i+1,j)) \qquad (4)$$

In this case a single line of the image is stored. Another simplification of the method consists of eliminating the very dark and very bright areas where the luminance values are very low and very high, respectively. As a matter of fact, natural areas having very low spatial activity appear naturally in these types of configurations.

It is then about detecting the areas of very low spatial activity. These areas are called non-natural uniform areas here. Actually, they result from a coding and then a decoding according to a block-based coding technique, which gives them a substantially zero spatial activity, which happens only very rarely for non-coded natural images. In the preferred embodiment the step (NND) of determining a non-natural uniform area (NN) detects such an area if the spatial activity value of 5 consecutive pixels is lower than a first predetermined threshold value equal to 3. The detection of non-natural uniform areas may also be effected over a larger number of consecutive pixels or even over a set of pixels of low spatial activity in a vertical direction. However, the results obtained with this embodiment are sufficiently good for not increasing the complexity of the method.

The next step then consists of detecting the strong edges (SE). Therefore, the detection method of ringing artifacts comprises a gradient filter step (GF) of the values (Y) of the pixels contained in the digital input image so as to produce filtered values (G). In the preferred embodiment said gradient filter step utilizes Sobel filters. Such filters have been chosen for they ensure an edge detection which is both robust and efficient. The Sobel filters $S_H$ and $S_V$ applied horizontally and vertically, respectively, are the following:

$$S_H = \begin{bmatrix} -1 & -2 & -1 \\ 0 & 0 & 0 \\ 1 & 2 & 1 \end{bmatrix} \quad S_V = \begin{bmatrix} -1 & 0 & 1 \\ -2 & 0 & 2 \\ -1 & 0 & 1 \end{bmatrix} \qquad (5)$$

The luminance values $G_H$ and $G_V$ after filtering are thus $G_H=Y.S_H$ and $G_V=Y.S_V$. These filtered values (G) are then compared with threshold values (THR1). If they are higher than the threshold values, a strong edge (SE) will be detected. In the preferred embodiment the horizontal threshold value $THR1_H$ and vertical threshold value $THR1_V$ are equal to 150 for luminance values varying from 0 to 255.

This is followed by an artifact determination step (RC). FIG. 2 illustrates the step of determining artifacts for a given configuration of pixel values. An artifact is determined if the spatial activity value of a current pixel is higher than a second predetermined threshold value and is concentrated on said pixel. In the preferred embodiment an artifact is determined if:

$$(\sigma_v(i,j)>3)et(\sigma_v(i,j)>4\cdot abs(Y(i-1,j)-Y(i+1,j)))\ ou(\sigma_h(i,j)>3)et(\sigma_h(i,j)>4\cdot abs(Y(i,j-1)-Y(i,j+1))) \qquad (6)$$

Determining the artifact is not sufficient, because areas of natural texture may sometimes be considered ringing noise if they are not analyzed in a larger context. Therefore, the artifact is analyzed in an area where a ringing artifact is likely to appear, that is to say, in an area comprised between a non-natural uniform area and a strong edge.

FIG. 3 illustrates the step (RD) of detecting ringing artifacts. In an idle state (IDS), the step does nothing. When a non-natural uniform area (NN) is detected while the detection step is in the idle state, the determination step (RD) activates the step of detecting a non-natural uniform area (NNS). This step counts the artifacts during a period of M consecutive pixels. After this period $\overline{(NN)}$ returns to the idle state (IDS). When a strong edge (SE) is detected while the detection step is in the idle state, the detection step activates the strong edge detection state (SES). This state counts the artifacts during a period of N consecutive pixels.

After this period, said state returns $\overline{(SE)}$ to the idle state (IDS).

If a non-natural uniform area (NN) is detected while the detection step is in a state of detecting strong edge (SES), the detection step activates the detection state of a ringing artifact (UPS). Similarly, if a strong edge (SE) is detected while the detection step is in a state of detecting a non-natural uniform area (NNS), the detection step also activates the state of detecting a ringing artifact (UPS). This state globally and locally counts the ringing artifacts and returns to the state of detecting the non-natural uniform area (NNS) when a new non-natural uniform area (NN) has been determined or to the state of detecting a strong edge (SES) if a strong edge has been detected.

Thus, a ringing artifact is detected if the artifact coming from the artifact determination step (RC) is situated between a non-natural uniform area (NN) and a strong edge (SE) which are close together, their proximity being defined by the periods M and N.

The detection method that has just been described permits to detect whether a video signal received by a set top box or a simple television receiver has been coded according to a block-based coding technique. Depending on the result of the detection method, corrective actions are then decided on. These actions are, for example, to apply a post-processing method as a function of the data produced by the detection method.

The data post-processing method according to the invention comprises a filter step which does not only apply to the detected ringing artifacts, but to all the pixels in a filtering area which is located between a non-natural uniform area and a strong edge which are close together or at least a ringing artifact has been detected.

In a first embodiment a linear filter is utilized and the filtering window is formed by 3×3 pixels. This filter $H_1$ is the following:

$$H_1 = \begin{bmatrix} 1 & 1 & 1 \\ 0 & 0 & 0 \\ 1 & 1 & 1 \end{bmatrix} \quad (7)$$

However, as the ringing noises appear very close to the edges, such a filter can deteriorate said edges. Therefore, a second embodiment is based on testing the neighborhood of a pixel in order to apply the adapted filter. A general approach based on this principle thus consists of carrying out 8 tests and using 16 different filters. In order to reduce the complexity of such an approach, only five types of configurations of pixels are taken into account. These configurations are illustrated in FIG. 4. The first configuration (C1) corresponds to the case where no strong edge has been detected. The second and third configurations (C2 and C3) correspond to the case where a pixel at the bottom and at the top of the filter window, respectively, has been detected as a horizontal strong edge (SHE). In that case the pixels adjacent thereto on the left and on the right are considered to be horizontal edges (HE). The fourth and fifth configurations (C4 and C5) correspond to the case where a pixel on the left and on the right of the filter window, respectively, has been detected as a vertical strong edge (SVE). In this case the pixels adjacent thereto at the top and at the bottom are considered to be vertical edges (VE).

In these conditions the filter step (FIL) utilizes five different filters ($H_1$ to $H_5$), that is to say, a first filter ($H_2$ to $H_5$) for a pixel adjacent to a strong edge (SE), the coefficients of said first filter depending on the position of the adjacent pixel relative to the strong edge, and a second filter ($H_1$) for the other pixels of the filtering area.

The filters $H_2$ to $H_5$ are the following:

$$H_2 = \begin{bmatrix} 1 & 2 & 1 \\ 1 & 2 & 1 \\ 0 & 0 & 0 \end{bmatrix} H_3 = \begin{bmatrix} 0 & 0 & 0 \\ 1 & 2 & 1 \\ 1 & 2 & 1 \end{bmatrix} H_4 = \begin{bmatrix} 0 & 1 & 1 \\ 0 & 2 & 2 \\ 0 & 1 & 1 \end{bmatrix} H_5 = \begin{bmatrix} 1 & 1 & 0 \\ 2 & 2 & 0 \\ 1 & 1 & 0 \end{bmatrix} \quad (8)$$

FIGS. 5a, b, c and d illustrate the post-processing step for the 5 configurations of pixels comprising non-natural uniform areas (NN) and strong edge (SVE or SHE). FIG. 5a corresponds to the configuration C4 for the pixel situated on the right of the strong edge (SE); the filter $H_4$ is thus applied to this pixel after which the filter $H_1$ is applied to the other pixels situated between the strong edge and the non-natural uniform area. FIG. 5b corresponds to the configuration C5 for the pixel situated on the left of the strong edge (SE); the filter $H_5$ is thus applied to this pixel and the filter $H_1$ is applied to the other pixels situated between the strong edge and the non-natural uniform area. FIG. 5c corresponds to the configuration C3 for the pixel situated below the strong edge (SE); the filter $H_3$ is thus applied to this pixel after which the filter $H_1$ is applied to the other pixels situated between the strong edge and the non-natural uniform area. FIG. 5d corresponds to the configuration C2 for the pixel situated above the strong edge (SE); the filter $H_2$ is thus applied to this pixel after which the filter $H_1$ is applied to the other pixels situated between the strong edge and the non-natural uniform area.

The data processing method according to the invention may gain efficiency if the post-processing method of ringing artifacts is applied in parallel with the post-processing method of blocking artifacts. FIG. 6 represents a diagram of the post-processing blocking artifact method according to the invention. Said data processing method comprises:

the gradient filter step (GF) of values (Y) of the pixels adapted to detect (THR2) a natural contour area (NC) in the digital input image, based on a horizontal threshold value $THR2_H$ and vertical threshold value $THR2_V$, respectively, equal to 35 and 50 for luminance values varying from 0 to 255, a blocking artifact detection step (BAD), comprising the sub-steps of:

calculating (CT) a discontinuity value based on the values (Y) of a current pixel and of adjacent pixels of said current pixel, giving the discontinuity values $c_v$ and $c_h$ based on the following equations:

$$c_v(i,j) = \begin{cases} 1 & si\ 2 \cdot Y(i,j) = Y(i-1,j) + Y(i+1,j) \\ 0 & \text{if not} \end{cases} \quad (9)$$

$$c_h(i,j) = \begin{cases} 1 & si\ 2 \cdot Y(i,j) = Y(i,j-1) + Y(i,j+1) \\ 0 & \text{if not} \end{cases} \quad (10)$$

determining (BAC) an artifact value A of the current pixel based on discontinuity values of the current pixel and of neighboring pixels of the current pixel, the object of this step being to determine a discontinuity centered on the current pixel having position (i,j), and a continuity in its vicinity as, for example, with the equation (11):

$$A(i,j) = \overline{c_h(i,j-1)} \cdot \overline{c_h(i,j)} \cdot (c_h(i,j+1) + c_h(i,j+3) + c_h(i,j-4) + c_h(i,j-2)) \quad (11)$$

where $\overline{c}$ represents the complementary value of c, identifying (ID) blocking artifacts based on artifact values, a horizontal blocking artifact or vertical blocking artifact being identified respectively if W consecutive artifacts in a horizontal direction or H consecutive artifacts in a vertical direction have been determined, H being the height of a block and W its width, storing (STO) a position in the image of the blocking artifacts coming from the identification step (ID) in tables hTab(i%H) and vTab(j%W), where i is the image line where the horizontal blocking artifact is situated, j the image column where the vertical blocking artifact is situated and % being the operator which results in the remainder of the division of i by H, calculating (GRID) a position of a grid that corresponds to the blocks of the block-based coding technique from a majority position (imax,jmax) of the blocking artifacts in the tables hTab and vTab, and a grid size from a larger value of counter values that represent a number of times that the distance occurs between a current vertical blocking artifact and a vertical blocking artifact immediately preceding the latter.

a low-pass filter step (LPF) of values (Y) of the pixels coming from the blocking artifact detection step (BAD), with the exception of the pixels contained in the natural contour areas (NC) determined by the gradient filter step.

The description above with reference to FIGS. 2 to 6 illustrates the invention rather than limits the invention. It is evident that there are other alternatives which come within the scope of the appended claims.

There are many ways of implementing the described functions by means of software. With regard to this, the FIGS. 2 to 6 are highly diagrammatic, each Figure representing a single embodiment. Thus, although a Figure shows various functions in the form of separate blocks, this does not exclude that a single software item carries out various functions. This does not exclude either that one function can be carried out by a set of software items.

It is possible to implement these functions by means of circuit of a television receiver or of a set top box, said circuit being suitably programmed. A set of instructions contained in a programming memory may cause the circuit to carry out various operations described earlier with reference to FIGS. 2 to 6. The set of instructions may also be loaded in the programming memory by reading a data carrier such as, for example, a disc that contains the set of instructions. The reading may also be effected via a communication network such as, for example, the Internet. In that case a service provider will make the set of instructions available to interested parties.

No reference sign in parentheses in a claim must be interpreted in a limiting fashion. The word "comprising" does not exclude the presence of other elements or steps stated in a claim. The word "a" preceding an element or a step does not exclude the presence of a plurality of these elements or of these steps.

What is claimed is:

1. A method of processing data contained in a digital input image formed by pixels, said method comprising the steps of:
    calculating (ACT) a spatial activity value of a current pixel based on values (Y) of said current pixel and of pixels adjacent thereto,
    determining (NND) a non-natural uniform area (NN) if the spatial activity value of various consecutive pixels is lower than a first predetermined threshold value,
    gradient filtering (GF) values (Y) of the pixels adapted to detect (THR1) strong edges (SE) inside the image,
    determining (RC) an artifact if the spatial activity value of a current pixel is higher than a second predetermined threshold value and is concentrated on said pixel, and
    detecting (RD) a ringing artifact if the artifact coming from the artifact determination step (RC) lies between a non-natural uniform area (NN) and a strong edge which are close together.

2. A data processing method as claimed in claim 1, characterized in that the gradient filter step (GF) utilizes a Sobel filter.

3. A data processing method as claimed in claim 1, characterized in that it further includes a step (FIL) of filtering values (Y) of the pixels comprised in a filtering area which is situated between a non-natural uniform area (NN) and a strong edge (SE) which are close together and where at least one ringing artifact has been detected.

4. A data processing method as claimed in claim 3, characterized in that the filter step (FIL) utilizes a first filter ($H_2$ to $H_5$) for an a pixel adjacent to a strong edge (SE), the coefficients of said first filter depending on the position of the adjacent pixel relative to the strong edge, and a second filter ($H_1$) for the other pixels of the filtering area.

5. A data processing method as claimed in claim 1, characterized in that it is associated with a method of processing blocking artifacts, the latter method utilizing the gradient filter step (GF) of values (Y) of the pixels for detecting an area of natural contours (NC) inside the image.

6. A data processing method as claimed in claim 5, characterized in that the blocking artifact processing method furthermore comprises the steps of:
    detecting blocking artifacts (BAD) comprising the sub-steps of:
        calculating (CT) a discontinuity parameter based on the values of a current pixel and adjacent pixels to said current pixel,
        determining (AC) an artifact value of the current pixel based on discontinuity parameters of the current pixel and of neighboring pixels of the current pixel,
        identifying (ID) blocking artifacts based on the artifact values,
    low-pass filtering (LPF) of the values (Y) of the pixels corresponding to block artifacts determined by the detection step (BAD) with the exception of natural contour areas (NC) determined by the gradient filter step (GF).

7. A "computer program" contained in a program memory product for a television receiver comprising a set of instructions which, when they are loaded in a circuit of the television receiver, causes said circuit to carry out the data processing method as claimed in claim 1.

8. A "computer program" contained in a program memory product for a set top box comprising a set of instructions which, when they are loaded in a circuit of the set top box, causes the said circuit to carry out the data processing method as claimed in claim 1.

* * * * *